US005691711A

United States Patent [19]

Jorgensen

[11] Patent Number: 5,691,711

[45] Date of Patent: Nov. 25, 1997

[54] DIGITAL ELECTRONIC KEY AND LOCK SYSTEM

[76] Inventor: Adam A. Jorgensen, 1911 NW. 36th St., Oakland Park, Fla. 33309

[21] Appl. No.: 393,857

[22] Filed: Feb. 24, 1995

[51] Int. Cl.$^6$ .................... H04Q 1/00

[52] U.S. Cl. .................... 340/825.31; 70/278

[58] Field of Search .................... 340/825.31, 825.3, 340/825.32; 70/278; 235/382, 444, 445, 446, 447, 448, 454, 458

[56] References Cited

U.S. PATENT DOCUMENTS

| | | | |
|---|---|---|---|
| 3,500,326 | 3/1970 | Benford | 340/825.31 |
| 3,782,148 | 1/1974 | Goldman | 70/278 |
| 3,821,704 | 6/1974 | Sabsay | 340/825.31 |
| 3,926,021 | 12/1975 | Genest | 340/825.31 |
| 4,050,063 | 9/1977 | Schull | 235/382 |
| 4,315,247 | 2/1982 | Germanton | 235/382 |
| 4,591,852 | 5/1986 | Brod | 340/825.31 |
| 4,868,559 | 9/1989 | Pinnow | 340/825.31 |
| 4,912,460 | 3/1990 | Chu | 340/825.31 |
| 4,990,906 | 2/1991 | Kell et al. | 340/825.31 |
| 5,132,661 | 7/1992 | Pinnow | 340/825.31 |
| 5,287,098 | 2/1994 | Jannsen | 340/825.31 |
| 5,309,152 | 5/1994 | Krucoff | 340/825.31 |

*Primary Examiner*—Edwin C. Holloway, III
*Attorney, Agent, or Firm*—Herbert L. Lerner; Laurence A. Greenberg

[57] ABSTRACT

A key and lock system for enabling access to at least one protected domain in response to an enabling signal. The system includes a key arrangement capable of generating a digital key code composed of least one and zero bits; an electronic device arranged for receiving the digital key code, a code-containing device for containing at least one further digital code, and a code-comparing arrangement connected to the electronic device and the code-containing device for generating the enabling signal when the digital key code is equal to the further digital code. The system further includes at least one keylock having a keyslot arranged to receive the key, and a digital code reader connected to the keylock for reading the digital key code, and an electronic gating arrangement for deriving from the key code a steering signal for steering the key code into the electronic device. The electronic device may be a digital computer which can have outputs for controlling an engine.

21 Claims, 7 Drawing Sheets

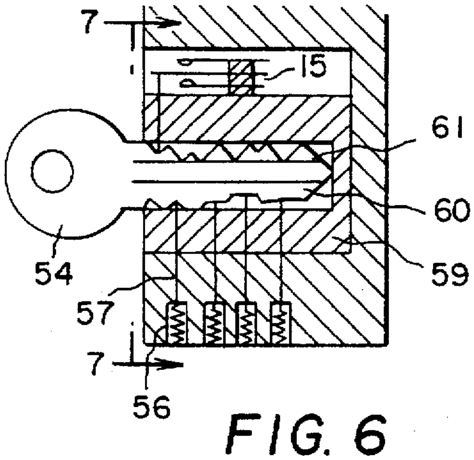
FIG. 6
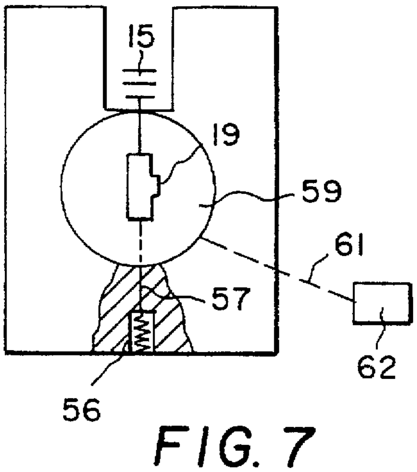
FIG. 7
FIG. 8
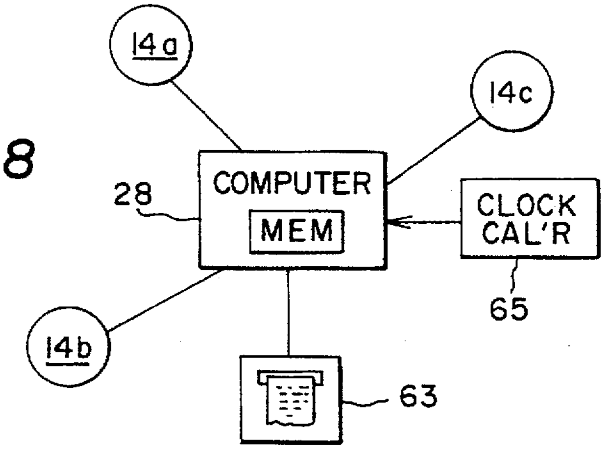
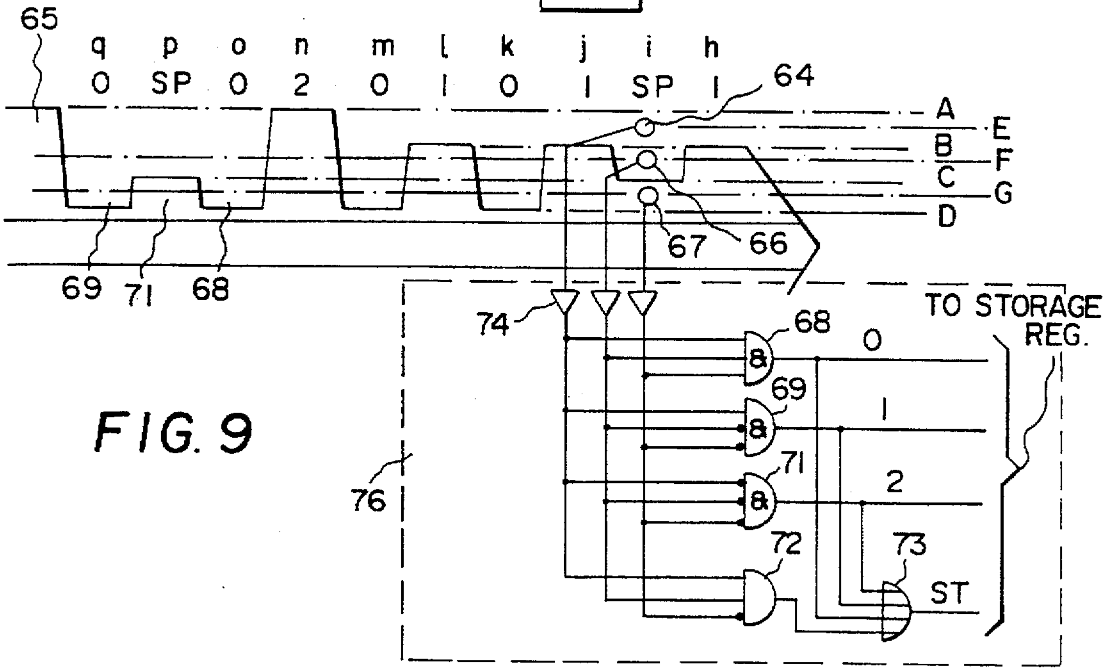
FIG. 9

DIGITAL ELECTRONIC KEY AND LOCK SYSTEM

BACKGROUND OF THE INVENTION

1. Field of the Invention

The invention relates to a digital electronic key and lock system for providing a high degree of protection against unauthorized intrusion into regions or domains protected by the system. The system includes a key with a digitally encoded key cam and a lock with a code reader adapted to receive and read the digital code, and an electronic device connected with with the code reader for verifying the code.

Over the years increasingly complex and sophisticated key and lock systems have been developed for preventing unauthorized access to protected domains such as automobiles, technically sensitive plants and institutions and the like. As is well known it has become very difficult to provide such protection to a satisfactory degree. The present invention is believed to offer a significant step forward in protection technology based on sophisticated digitally encoded electronic computer-controlled locks.

The prior art includes the well-known Yale lock, wherein a flat key has a key cam milled to a certain contour. The key is inserted in a matching lock having a row of spring-biased two part pin tumblers inserted in a cylinder. When a key is inserted into the lock, the tumblers are aligned by the key cam such that the separation between the tumblers allow the cylinder to be turned by the key to unlock the lock.

Locks of this type are used in most motor vehicles to protect the interior of the vehicle and to prevent unauthorized start of the engine. To this end the lock is equipped with electrical contacts that operate to energize the engine start functions including the engine computer which in turn controls fuel injection, ignition, the starter and so forth. The problem with this approach is that any electric wiring needed to start the engine can be accessed and/or by-passed by car thieves who need only have a moderate knowledge of the vehicles wiring. Electronic locks that require insertion of certain protective codes from a keyboard can also be by-passed by thieves having only a certain amount of knowledge of the vehicle wiring.

In the prior art U.S. Pat. No. 4,990,906 discloses a system wherein the ignition key has a small resistor element of a known value which is inserted in the ignition key. Upon start of the engine the resistance of the resistor element is automatically measured and must match a certain resistance value stored in the vehicle computer. If no match is found the engine will not start. The problem with this system is that the resistance value can vary within wide ranges due to surface contamination on the resistor element, and the element tends to fall out of the key due to rough handling of the key. Also, it is easy for an impostor to place a variable resistance across the measuring contacts and by trial and error find a workable value.

U.S. Pat. No. 5,132,661 discloses a security system wherein an optical reader in the key lock reads the contour of the key cam. This system has the drawback that the key contour represents an analog function and requires a special key with holes of varying diameter in the key in order to provide calibration of the decoding system. This system uses a high speed sampling frequency to scan the contour of the key, and uses complex pattern recognition with analog to digital conversion to determine the analog contour of the key cam.

2. Summary of the Invention

It is accordingly a primary object of the present invention to provide a very secure, yet uncomplicated and reliable electronic digital key and lock system that provides virtually un-breachable protection against unauthorized intrusion. It is a further object to provide a system that is entirely digital in operation and is therefore not subject to wear and contamination to the degree which is almost unavoidable with all analog type key and lock systems.

In accordance with the invention there is provided a digital electronic key and lock system for protecting access to a protected domain, including a key having at least one key cam formed to a contour representing a digital key code, a key lock for receiving the key, a code reader connected with the lock for reading the digital key code, a digital computer for storing an enabling code for enabling access to the protected domain, connected to the code reader, and comparison means in the computer for comparing the digital key code with the enabling code, and enabling means in the computer operative for enabling access to the protected domain when the digital key code is determined by the comparison means to be equal to the enabling code.

The key cam is formed to a contour having a plurality of peaks and valleys wherein the peaks and valleys each represent digital bits such as digital ones, twos, and zeros.

The digital key and lock system according to the invention may further include an elongate key slot for receiving the key, sensing means in the form of e.g. a feeler pin disposed in the key slot proximal to the key entrance in spring biased engagement with the key cam for feeling the peaks and valleys in the key cam, and an electric transducer coupled with the feeler pin for generating electric signals, each signal selectively identifying each peak and valley as one of a number of digital bits, such as zeros, ones and twos, and wherein the transducer includes at least first and second contact springs spaced apart a given spacing, and a flexible transfer contact disposed between e.g. the first and second contact springs in operative engagement with the feeler pin, and wherein the first and second contact springs are each connected with a respective signal source, each signal source representing one of the digital bits. The signal sources may be in the form of different electrical potentials or different frequency signals.

The electric transducer may alternatively include photo sensors and respective light sources paired with the photo sensors and aligned with the peaks and valleys of the key cam so that each peak and valley generates a distinct electrical output from the photo sensors that can be decoded as digital number bits by an electronic decoding circuit, connected to the photo sensors.

The invention may further include the feature that the digital computer includes a program memory having a plurality of numbered addresses, and wherein the enabling code is stored in one of the numbered addresses, wherein the one of the numbered addresses has a concealed address number, and wherein the concealed address number is stored in another one of the numbered addresses.

According to a further feature the electronic key and lock system of the invention may include a protected domain which has at least one of the control functions of an internal combustion engine, wherein the control functions include at least one of fuel injection control, ignition control and other vehicle controls.

According to another feature the protected domain includes a defined space.

According to additional features the digital electronic key and lock system according to the invention may include a key, wherein the key includes at least two key cams facing in opposite directions or in directions diverging at different angles to each other.

According to still another feature of the digital electronic key and lock system the digital key code includes a partial code containing location information for the lock.

Other features which are considered as characteristic for the invention are set forth in the following disclosure and appended claims.

Although the invention is illustrated and described herein as embodied in a digital electronic key and lock system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 6 shows details of the invention based on a combination Yale key and the digital key according to the invention;

FIG. 7 is an end view of the arrangement according to FIG. 6 seen along line 7—7 of FIG. 6;

FIG. 8 is a multi-lock arrangement sharing a common computer having separate code memories for different locks;

FIG. 9 is a diagrammatic view of a code cam encoded in ternary code; and parts of an electronic encoding circuit therefor;

DESCRIPTION OF THE PREFERRED EMBODIMENTS

Figure 1:
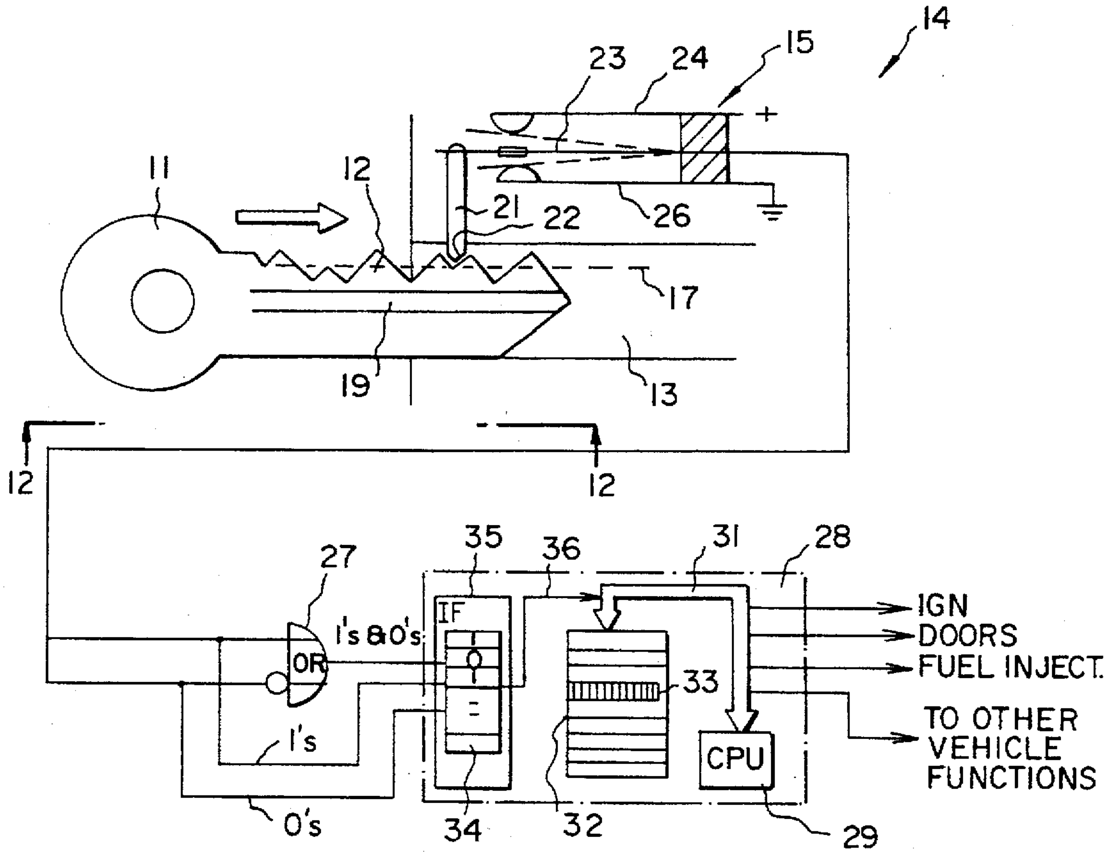
FIG. 1 is a diagrammatic view of the invention showing a digitally encoded key encoded in binary notation, a code reading mechanism, and a block diagram of a computer with a memory for storing the key code.
Figure 2:
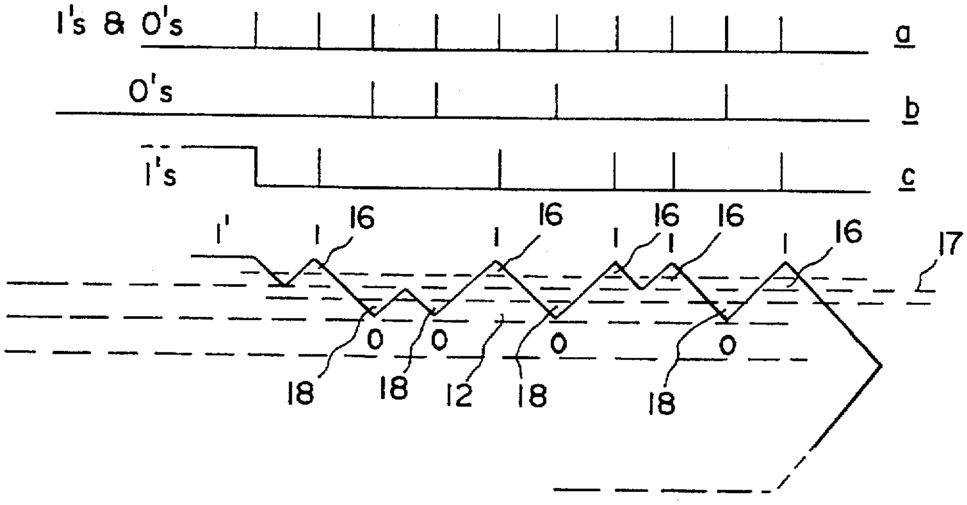
FIG. 2 shows details of a binary encoded key cam of and three pulse tracks showing clock pulses, zero pulses and one pulses.

In FIG. 1 a key 11 having a binary encoded key cam 12 is being inserted into a matching slot 13 in a key lock 14. The key cam 12 is shown in greater detail in FIG. 2 as having a series of peaks 16 that all extend above a centerline 17, and a series of valleys 18 that all descend below the centerline 17. The peaks and valleys represent respective e.g. ones and zeros of a binary number, which in turn represents a binary key code associated with the key. In FIG. 1 the peaks represent the ones and the valleys represent the zeros of the digital word. It is not necessary to define which end of the word represents the least significant bits, but for the purpose of description it is assumed that the right hand bit is the least significant bit. Accordingly the binary number shown in FIG. 2 is 1001011010 which provides 1024 different combinations. It follows that the ten bit word size shown is only an example, and that the key can be configured with any number of bits as can be practically accommodated.

Figure 3:
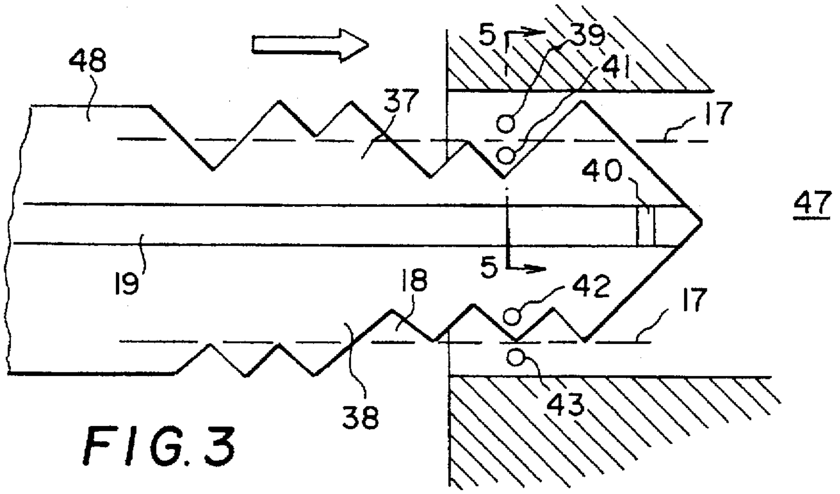
FIG. 3 shows a key with two binary encoded key cams, and respective photo-electric code readers.

It will also be understood that the key 61 can have more than one key cam. Another cam 38 facing in opposite direction as the first cam is shown in FIG. 3. One key cam with nine (9) bits yields 512 different key combinations. A key with two cams each with 9 bits accordingly yields 512 times 512 combinations which equals 262144 combinations. Keys with more than two cams may be constructed if cams in several planes are contemplated. A key constructed in one plane may have an elongate stiffener in the form of a center rib 19 as seen in FIG. 3.

In FIG. 1 the key lock 14 has a code reader 15 which includes an e.g. downward biased feeler pin 21 having a lower end 22 that follows the contour of the key cam 12 as the key is inserted into the slot 13 of the key lock 14. The feeler pin 21 has an upper end connected to a flexible contact spring 23 that is flexibly movable between an upper fixed contact spring 24 and a lower fixed contact spring 26. The fixed contact springs 24, 26 are connected to respective different potentials or signals. As shown the upper contact 24 is connected to a plus (+) potential and the lower contact spring 26 to ground potential. It follows that other potentials or signals may be applied, such as for example alternating voltages of different frequencies or plus and minus potentials as may be preferred for any particular application.

As the key 11 is inserted into the key slot 13 of the lock 14 the flexible contact spring 23 is variably receiving plus or ground potentials depending on the location of the peaks and valleys on the key cam 12. The signals from the flexible spring are connected to an electronic OR-gate 27 having an upper non-inverting input responding to the plus potentials and a lower inverting input responding to the ground potentials. The output of the OR-gate generates a string of ones each representing a plus or a ground potential from contact with fixed contact springs 26,24 as the feeler pin 21 follows the profile of the key cam 12. An electronic shift register 34 operates to store the 1s and 0s in respective memory cells under control of the 1s from the output of the OR-gate 27 which operate as steering pulses that serve to steer the ones and zeros into successive memory cells of a shift register 34 which is a part of a computer interface 35 of a microcomputer 28. Only the major parts of the microcomputer 28 are shown, such as the central processing unit CPU 29, a memory 32 with addresses for containing control programs and data in conventional manner. A data bus 31 interconnects the various parts of the computer including the interface 35, and also provides connections in conventional manner between the control elements of the locks controlling access to the domains controlled by the computer. In the case of an automotive engine the control elements are typically the fuel injection and ignition, without which the engine will be unable to start and operate.

In other words the computer 28 is configured to control access to the particular space or function, i.e. the domain to be protected by the lock. In FIG. 1 the computer 28 is shown as an example as part of an automobile engine control system which controls in conventional manner the primary engine functions such as ignition and fuel injection and any other vehicle functions that may require protection against unauthorized intrusion. These may include operation of the engine starter and the door locks and other locks if these are equipped with an operative connection to the computer.

Part of the memory 32 is usually of a so-called read-only type (ROM or EROM) that retain their memory contents when power is disconnected from the computer and operate to start up the computer when it is powered up. Of particular interest in this connection is a memory location 33, which contains a code which is to be matched with the digital key code stored in the shift register 34. When the computer determines that the digital code in memory location 33 is equal to the key code stored in shift register 34 the computer is enabled to proceed to perform all the functions required to start and operate the engine, in the case of an engine or vehicle protection system, or in case the protected domain is an enclosed area, with protective access elements such as door locks controlled by the computer.

To provide maximum protection against unauthorized intrusion the address of the protected key code 33 can be arranged such that its location is not readily available to scrutiny by the conventional diagnostic tools used in repair and service shops. In order to make the protected code available to only authorized individuals the computer program may be arranged such that the protected code can be accessed only by entering a special access code known only to authorized individuals. As an example the access code may be constructed on the basis of data known only to the person owning the vehicle.

As stated above, FIG. 2 shows details of a key cam in an embodiment corresponding to the configuration of FIG. 1 wherein the peaks and valleys are triangular. The peaks 16 are shown representing ones and valleys 18 represent zeros. The peaks and valleys are symmetrical about a centerline 17. Lines a, b and c shows three pulse tracks of which track a are the steering pulses from the output of OR-gate 27, track b are the zero pulses aligned with the valleys 18 of the key cam 12, and track c are the one-pulses aligned with the peaks 16 of the key cam 12.

Figure 4:
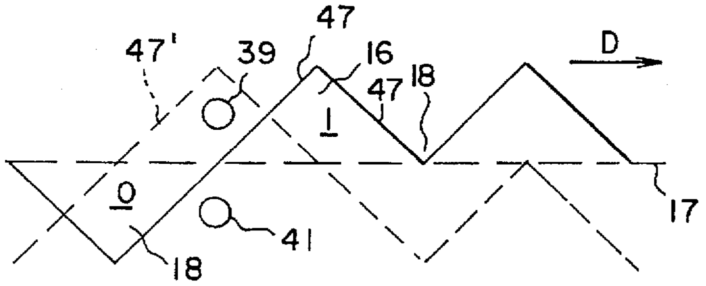
FIG. 4 shows details of the photo-electric code reader reading a transition between two digit bits.

FIG. 3 is a fragmentary view of a key having opposite facing binary encoded key cams 37,38 arranged for optical scanning by means of photo sensors 39, 41, 42, 43. Each sensor is active when it it positioned opposite a valley 18 and both sensors are inactive when they are obliterated by a peak. During transitions between digits there will be a position between two digits wherein the lower photo sensor 41 will be obliterated, i.e. inactive, and the upper sensor 39 is active. This state is shown in FIG. 4, wherein the phantom line 47 shows a key contour indicating a binary 1 with both photo diodes obliterterated moving in direction to a next digit, as indicated by arrow D. The solid line 47 shows the key contour in transition to a next digit, in this case a 0. In the transition phase the upper photo sensor 39 is active and the lower one is inactive. It can be seen that during each transition between two digits there will be a position wherein the upper photo sensor is active and the lower one is inactive. This allows each transition between digits to be detected by means of a logic circuit as shown in FIG. 5.

Figure 5:
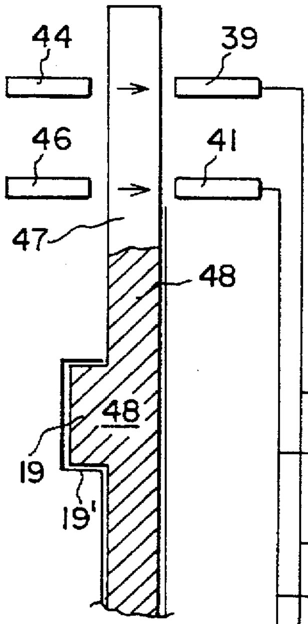
FIG. 5 shows further details of a photo-electric code reading arrangement; including details of an electronic reading apparatus.
Figure 5:
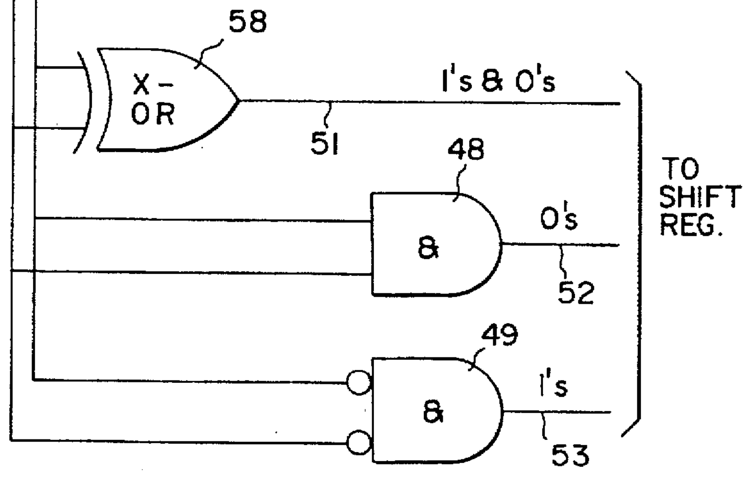

FIG. 5 includes a detail of FIG. 3, seen along line 5—5 of FIG. 3 showing the two photo sensors 39, 41 each aligned with a respective light emitter 44, 46. The key 48 is seen cross-hatched in cross-section partially inserted in the key slot 47. The outputs of the two photo sensors 39, 41 are connected to respective upper and lower inputs of AND-gates 48, 49, AND-gate 49 having two inverted inputs, and to an exclusive OR-gate 58.

It is readily seen that whenever a valley is in the field of photo receivers 39, 41 AND-gate 48 will have an active output 52 showing presence of a logic 0 in the key cam, and whenever a peak is in the field of the photo receivers AND-gate 49 with inverting inputs will have a logic one on its output lead 53, indicating presence of a logic one in the key cam. Also, whenever the key during insertion is in the transition between two digits the exclusive OR-gate 58 will have a logic one on its output lead 51, which indicates a transition between adjacent digits. The transition signals on output 52 are therefore capable of operating as steering signals for entering the ones and zeros from AND-gates 48, 49 into successive locations in a receiving register, e.g. a shift register 34 in the computer 28. It should be noted that there need not be a shift register in the computer but that the successive digits from the code reader can, by means of software stored in the program memory 32 be steered directly into successive memory locations in the program memory 32.

FIGS. 6 and 7 show a hybrid key and lock system, wherein at a part of the key 54 and the lock 7 is arranged as a hybrid Yale key and lock, with the downward facing key cam 60 or at least a part of it being arranged as a conventional Yale key engaging a cylinder 59 with a set of pin tumblers 57 each biased by a spring 56 against the key cam 60, while the upper key cam 61 is arranged as a digital key cam in engagement with the key code reader 15 as described above. This arrangement is especially advantageous in cases wherein it is desirable to operate a mechanical device 62, FIG. 7, for example to unlock a steering wheel or a door lock by turning the key in the lock, or an electric switch.

It follows that electrically operated door locks are especially easily controlled by the key and lock system according to the invention, since the solenoid controlling the lock can be readily controlled by the computer via a relay or power transistor connected to the lock solenoid.

Figure 11:
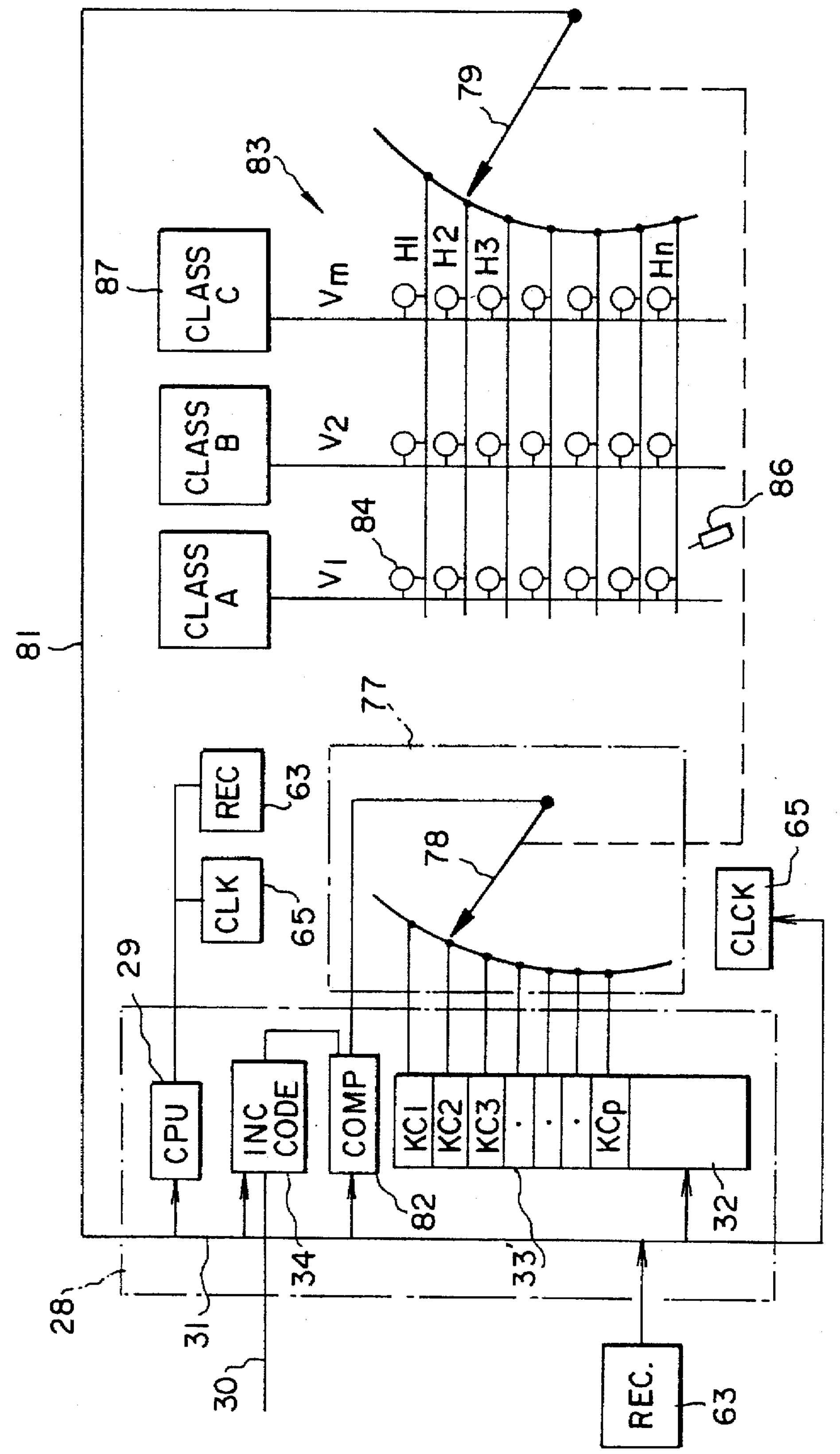
FIG. 11 is a multi-user digital key-and lock system according to the invention.

FIG. 8 shows a key and lock system according to the invention wherein the computer 28 is arranged to recognize more than one key code, so that different constraints can be imposed on keys with different codes. In FIG. 8 the computer is connected to a plurality of locks **14*a*, 14*b*, 14*c* and so forth, controlling access to different domains. The computer 28 may further be connected to a clock-calendar 65. Control programs in the computer memory or logic circuits may be provided to control the various constraints. As an example one class of keys may be able to access one or several or all of the locks 14*a*, 14*b*, 14*c*, and so forth. Some classes of keys may have access only at certain times and to certain locks as controlled by the computer, the clock-calendar 65 and the key code. FIG. 11** shows a logic diagram of a system with such selective access.

In accordance with an additional feature a recording device 63 may be connected to the computer 28 so that the identity of any key may be recognized when used to access any of the locks, and the time of entry and/or egress can be recorded for later scrutiny.

FIG. 11 is a more detailed view of the key- and lock system according to FIG. 8, showing the computer 28 having in its memory 32 a plurality of key code stores KCl . . . KCp all connected to a scanner 77, shown as a rotating switch with a switch arm 78, which can scan all key code stores KC. The switch arm 78 is ganged with another switch arm 79, connected via bus 81 with the computer bus 31. When an incoming request for an entry arrives at the incoming code store 34 with a key code being entered in incoming code store 34, the incoming code is connected to the upper input of a comparator 82. A lower input to the comparator is connected to switch arm 78. It follows that in modern electronic systems switches with switch arms would be replaced by suitable multiplexing arrangements. Switches with arms 78, 79 are shown simply for the sake of clarity.

In operation, when a request for entry arrives from a lock 14*a*, 14*b*, or 14*c* containing a digital key code on lead 30 to the incoming code register 34, the lower output of comparator 34 is connected to the scanner arm 78, which starts to search key code stores KC looking for a match with the incoming key code. Assuming that the scanner stops at key code store KC2 as shown, the other scanner arm 79 stops at a horizontal bus H2 of a matrix 83, having a number of verticals V1, V2 - - - Vm. Each vertical represents an access class A, B, C - - - , 87, which each represents a certain level of access privileges or restrictions, as indicated by class letters A, B, C, etc. Box 87 generates a class code. Each horizontal H1, H2 - - - can be connected to a desired class code vertical V1, V2 etc. at any selected connecting point 84 by means of a plug shown symbolically at 86. The class code information is transmitted by means of which access is allowed or denied and any other constraints as may apply can be imposed by means of the access class code. It follows that a physical matrix with horizontals and verticals and plug interconnection at the cross points may be replaced by an all electronic matrix but the principle would remain the same.

FIG. 9 shows a key cam having a ternary encoded profile, i.e. its digital code is arranged for a ternary number system having bit values 0, 1 and 2 plus a space code. Four levels of cam contours are required as indicated by stippled lines A, B, C and D. As seen in the figure level A has arbitrarily been assigned ternary value 2, level B value 1, level C the value of a space, and D ternary value 0. Whenever a transition from one value to another takes place no transition signal is required, but whenever two successive bits of the same ternary value are encountered during insertion of the key it is necessary to insert a space bit in order for the reading device to detect presence of a new bit. Reading the key code from right to left each bit is labeled by letters from h to q in the upper row. Each bit value is shown below the letters, starting with a 1 under letter h, followed by a space in position i, which is necessary because the next bit in position j is again a 1. Next follows under k a 0 bit cut down to level D, under 1 a 1 bit, followed under m by a 0 bit, and under n a 2 bit cut to the A level, followed under o by a 0 bit, followed under p by a space bit since the next bit under q is again a 0 bit. It is seen that the ternary digital code is formed of peaks and valleys. The peaks are shown as rectangles or trapezoids which enables a more compact construction of the optical reading apparatus, shown as photo sensors 64, 66, and 67. An electronic circuit 76 is shown connected to the photo sensors for decoding the signals from the photo sensors. Each photo sensor is connected to a respective amplifier 74 the outputs of which are connected to four AND-gates 68, 69, 71, and 72 having non-inverting inputs and inverting inputs indicated by a small dot. It is readily seen that the AND-gates 68, 69, an 71 respectively generate the ternary values 0, 1, 2 and that gate 72 generates the space function. All AND-gate outputs are connected to the inputs of an OR-gate 73 which generates the steering pulses ST required to steer the recording of the individual ternary bits into their storage locations at the receiving apparatus.

It follows that by adding still more levels to the peaks and valleys digital encoding systems based on even higher bases than three may readily be constructed following the principles disclosed above for the ternary system.

Figure 10:
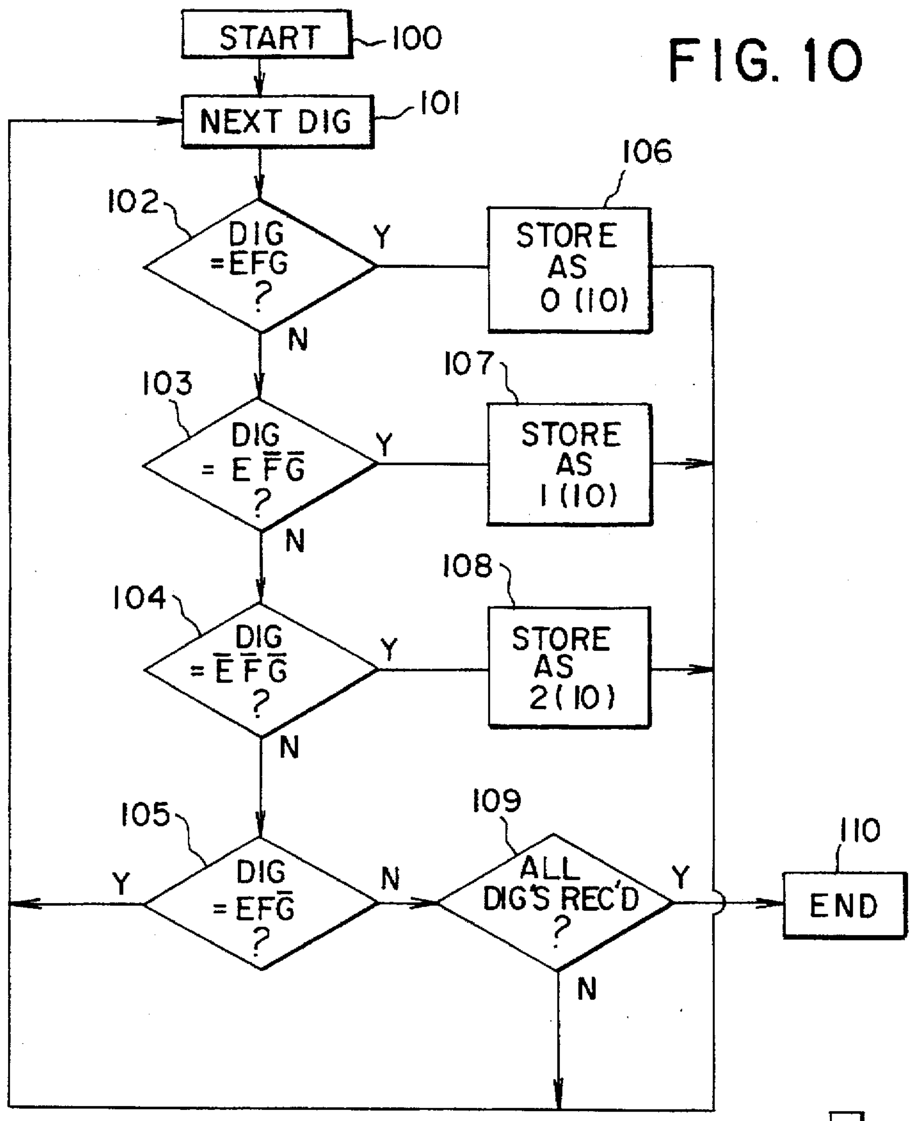
FIG. 10 is flowchart showing the encoding process for reading a ternary key code.

FIG. 10 is a flowchart showing in steps 101 to 109 how the ternary digits may be entered into a computer. After first step 100 a next digit is entered in step 101. If the digit is equal to Boolean EFG, it will be stored in step 106 as a decimal 0 (Zero). If it is not EFG, a test is made in step 103 to see if it is $E\bar{F}\bar{G}$. If affirmative it is stored as a decimal 1. If it is not $E\bar{F}\bar{G}$ it is tested in step 104 to see if it is $\bar{E}\bar{F}\bar{G}$. If affirmative it is stored as a decimal 2. If it is not it is tested in step 105 to see if it is $EF\bar{G}$. If affirmative it is a start signal ST leading back to step 101, anticipating a next digit. If not, the next step is 109, which tests to see if all digits have been received. If not, the next step is step 101 anticipating a next digit. If affirmative next step is step 110 wherein the received number is compared with the secret code stored in the code containing means, that must be matched by the digital key code in order to enable access to the protected domain 223 in FIG. 14.

Figure 12:
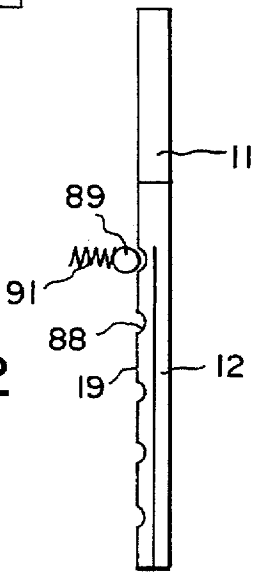
FIG. 12 is an edge view of the key in FIG. 1, seen along the line 12—12.

It should be noted that in the digital key system using optical digit sensing it may be advantageous to provide a degree of tactile feel during insertion of the key as is known from conventional mechanical key systems. Such tactile feel can be provided in various ways, e.g. by providing small indentations 88 (FIG. 12) in e.g. the side rib 19 of the key and a detent, e.g. in the form of a spring-biased ball or detent 89 biased by spring 91 engaging the indentations during the insertion of the key. The detent also operates to retain the key in the key slot until it is later withdrawn from the key slot.

Figure 13:
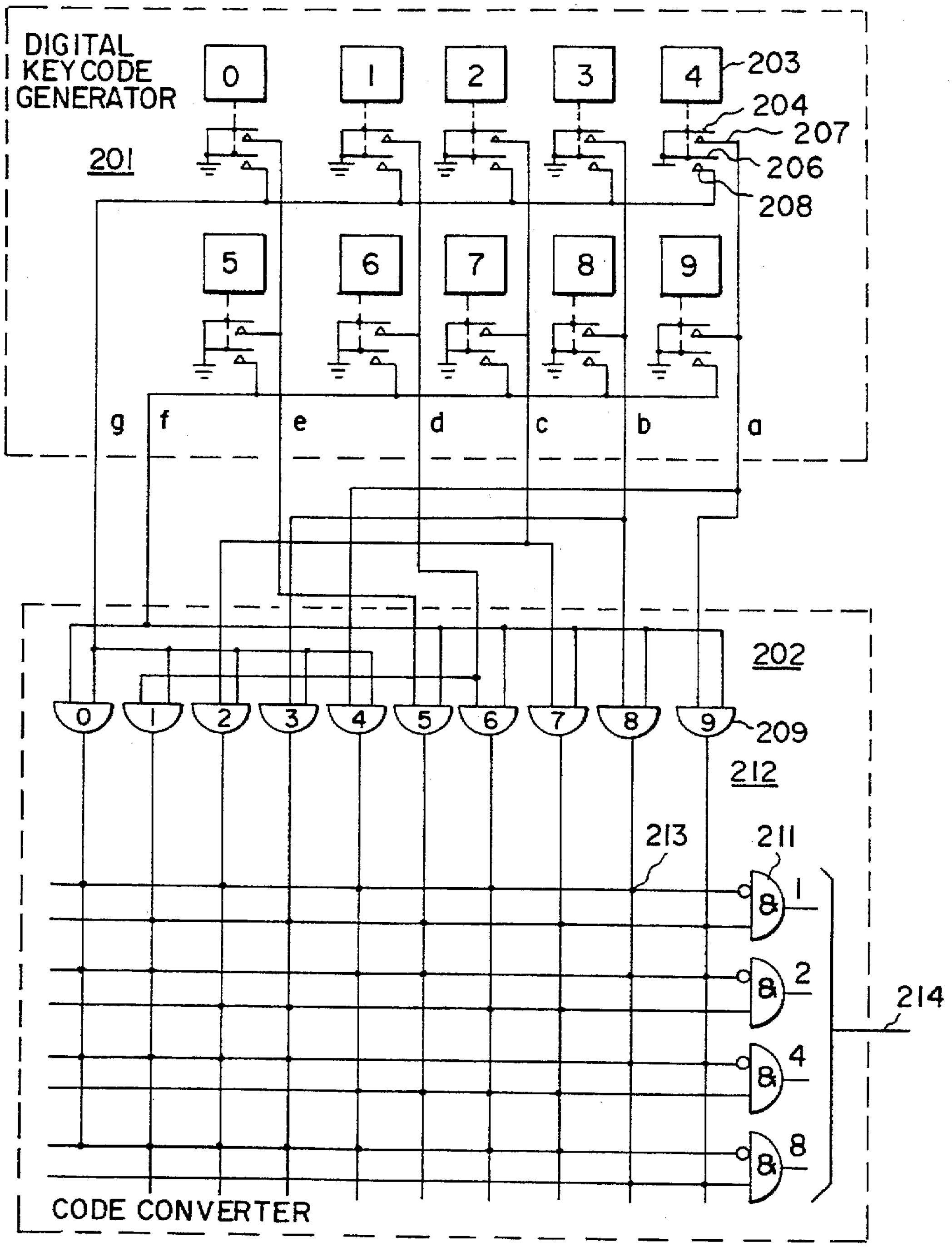
FIG. 13 is a circuit diagram of a digital key and lock system based on individual key switches for generating a digital key code.

FIG. 13 shows an embodiment of the invention wherein the digital key code generating apparatus is a bank of non-locking e.g. pushbutton switches 203, each labeled by an alphanumeric designation, e.g. from 0 to 9 as shown. Each switch 203 has e.g. to pairs of make-contacts 204, 207 and 206, 208, wherein all contacts 204, 206 are operated by the pushbutton, and all contacts 207, 208 are connected to a certain voltage or signal, in the figure shown as a ground potential, but it follows that any other potential may be selected. When any pushbutton is depressed ground potential is extended to one of leads g or f, and also on one of leads a, b, c, d or e. In other words the switches generate a two out of seven code. Numerous other code arrangements are known and used. A code converter 202 receives the two out of seven codes and converts them to a binary 1, 2, 4, 8 code on output 204 which is most commonly used for transmitting to a computer.

Figure 14:
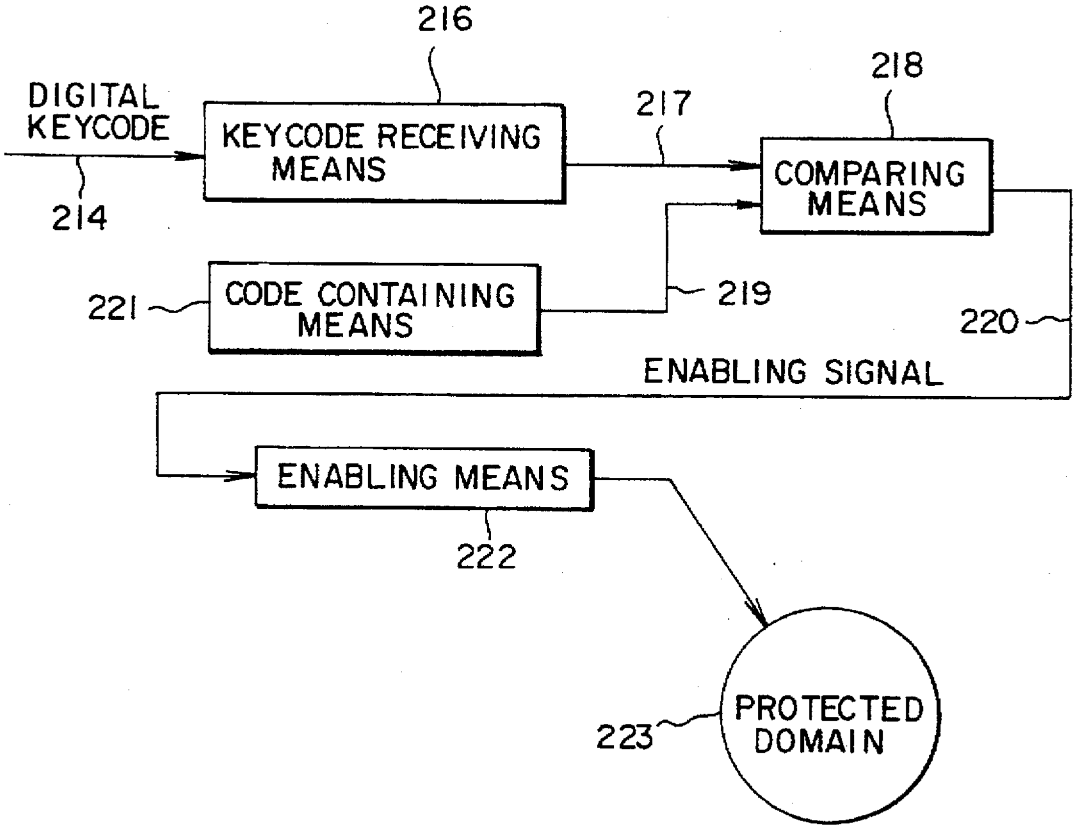
FIG. 14 is a block diagram of the invention in its most basic form.

FIG. 14 is a block diagram of the most basic configuration of the electronic device of the invention. This configuration is composed of the key code storing means 216 which receives the digital key code on lead 214, the code containing means 221 which holds the further digital code, that must be compared and matched with the digital key code in comparator 218 to generate an enabling signal on lead 220. The enabling signal activates the enabling means 222 e.g. a digital computer, which in turn provides access to the protected domain 223. It should be noted that the arrangement in FIG. 14 is not satisfactory unless it can be located within the protected domain. This can normally not be arranged in e.g. an automobile or the like, and the arrangement of FIG. 14 should therefore preferably be in the form of a digital computer. In the case of a digital computer it would be virtually impossible for an impostor to emulate the signals required to operate ignition and fuel injection to the engine. It is remotely possible that an impostor may have a substitute computer for which he has a working key, that he can insert in place of the computer in the targeted vehicle. Several strategies are available to counteract such substitution. One such strategy contemplates that the vehicle computer has a special person code stored therein that relates to a number known only to the lawful owner of the vehicle and/or the authorized service organization. This number must be matched by a key device, e.g. a small PLA (Programmable Logic Array) that must be programmed by conventional means to match the special person code and must be wired to the back plane of the vehicle computer so that it can only be removed and replaced by use of proper tools. Another strategy contemplates that another vehicle computer than the engine computer has the personal code stored therein and communicates with the engine computer before a start of the engine can be initiated, to verify that the proper user of the vehicle is attempting to use the vehicle.

I claim:

1. A digital key and lock system for enabling access to at least one protected domain in response to an enabling signal, comprising:

key means having at least one key cam configured for representing a digital key code composed of at least zero and one bits marked in line on said key cam; an electronic device having means for receiving the digital key code, code-containing means for containing at least one further digital code, code-comparing means connected to said means for receiving the digital key code and to said code-containing means, said code comparing means operative for generating the enabling signal when said digital key code is equal to said further digital code; at least one key lock having a key inlet adapted to receive the key, and a digital code reader connected to the key lock being operative for reading the digital key code; and electronic gating means coupled to said digital code reader for deriving from said digital key code steering pulses for steering said digital key code into said key code receiving means.

2. A digital key and lock system according to claim 1, wherein said electronic device is a digital computer.

3. A digital key and lock system according to claim 1 including a cylinder rotatably disposed in said key lock, at least one pin tumbler disposed in said cylinder, and wherein a portion of said cam is encoded to engage said pin tumbler for enabling rotation of said cylinder.

4. A digital key and lock system according to claim 1, wherein said cam has a contour which includes a plurality of peaks and valleys representing respective bits of said digital key code.

5. A digital key and lock system according to claim 4, wherein said digital key code is a binary code.

6. A digital key and lock system according to claim 5, wherein said code reader has a feeler in sliding engagement with said cam contour, a pair of fixed electrical contacts each connected to a respective one of a pair of electrical signals, a flexible contact disposed between said fixed contacts coupled with said feeler for receiving successively one of said electrical signals as said feeler engages successive peaks and valleys of said contour.

7. A digital key and lock system according to claim 6, wherein one of said electrical signals is a plus potential, and the other one is a ground potential, and wherein said electronic gating means include an OR-gate having a non-inverted input and an inverted input commonly connected to said flexible contact for generating a string of steering pulses for steering the bits of said binary code into successive memory locations of said electronic device.

8. A digital key and lock system according to claim 4, wherein said code reader includes a pair of photo sensors in alignment with said cam such that a valley exposes both of said photo sensors, and a peak obliterates both of said photo sensors, and wherein a transition between two bits of the digital code exposes one and obliterates the other one of said photo sensors.

9. A digital key and lock system according to claim 8, wherein said electronic gating means include an electronic circuit connected to said photo sensors, said electronic circuit including an exclusive OR-gate having two inputs each connected to a respective one of said photo sensors for generating a string of steering pulses, an AND gate having two non-inverting inputs each connected to a respective photo sensor for generating a zero-pulse representing a valley of said cam contour, and another AND-gate having two inverting inputs each connected to a respective one of said photo sensors for generating a one-pulse representing a peak of said cam contour.

10. A digital key and lock system according to claim 1, wherein said means for generating a key code include a plurality of key switches, each key switch operative for generating a part of the digital key code; each key switch having switch means for generating an electrical signal representing said part of the digital key code.

11. A digital key and lock system according to claim 10, wherein each of said key switches is assigned an alphanumeric designation representing said part of the digital key code.

12. A digital key and lock system according to claim 10, including a code conversion circuit having a plurality of inputs for receiving a respective one of said electrical signals, said code conversion circuit operative for converting said electrical signals to signals suitable for said electronic device.

13. A digital key and lock system according to claim 1, wherein said code containing means include means for containing a first plurality of further digital codes, and said code generating means include means for generating a second plurality of digital key codes, each key code generating means operative for generating a digital key code matching at least one of said first plurality of further digital codes.

14. A digital key and lock system according to claim 13, including recording means connected to said electronic device for recording the digital key code of at least one entry into the protected domain.

15. A digital key and lock system according to claim 13, wherein said first plurality of key codes are divided into a plurality of classes, wherein at least part of said digital key code is common to all members of said plurality of classes.

16. A digital key and lock system according to claim 13, including a class assignment arrangement for assigning a class to at least one of said digital key codes, wherein said part of said digital key code is operative for identifying the class assigned to said digital key code.

17. A digital key and lock system for enabling access to at least one protected domain in response to an enabling signal, comprising:

a key arrangement adapted to represent a digital key code composed of at least zero and one bits; an electronic device adapted to receive the digital key code having a code-containing arrangement adapted to contain at least one further digital code, and a comparing arrangement having inputs connected to said key arrangement and to said code-containing arrangement for generating the enabling signal when said digital key code is equal to said further digital code; and an electronic gating arrangement coupled to said key arrangement for deriving steering pulses from said digital key code for steering said key code into said electronic device.

18. A digital key and lock system according to claim 17, wherein said electronic device is a digital computer having outputs for controlling engine functions including at least one of fuel feed, ignition, and starting of the engine.

19. A digital key and lock system according to claim 17, wherein said key arrangement includes at least one key having at least one key cam having a contour representing the digital key code.

20. A digital key and lock system according to claim 19, wherein said contour includes a plurality of peaks and valleys.

21. A digital key and lock system according to claim 20, wherein said peaks and valleys represent respective bits of said digital key code.

* * * * *